United States Patent [19]

Rowe, Jr. et al.

[11] Patent Number: 4,794,721
[45] Date of Patent: Jan. 3, 1989

[54] FISHING LURE ATTACHMENT

[76] Inventors: Robert R. Rowe, Jr.; Sherry Rowe, both of 3668 Moorland Ave., Santa Rosa, Calif. 95407

[21] Appl. No.: 88,399

[22] Filed: Aug. 21, 1987

[51] Int. Cl.⁴ ............................................. A01K 85/00
[52] U.S. Cl. ................... 43/42.14; 43/42.13; 43/42.15
[58] Field of Search ............... 43/42.13, 42.14, 42.15, 43/42.11

[56] References Cited

U.S. PATENT DOCUMENTS

| | | | |
|---|---|---|---|
| 1,874,883 | 8/1932 | Brown | 43/42.14 |
| 2,886,913 | 5/1959 | Stanley | 43/42.19 |
| 2,911,753 | 11/1959 | Beckett | 43/43.2 |
| 3,118,244 | 1/1964 | Coburn | 43/42.13 |
| 3,604,140 | 9/1971 | Nelson | 43/42.19 |
| 3,775,892 | 12/1973 | Bennetts | 43/42.14 |

Primary Examiner—Nicholas P. Godici
Assistant Examiner—Carmine Cuda
Attorney, Agent, or Firm—Larry D. Johnson

[57] ABSTRACT

A fishing lure attachment provides a fish-attracting device that mimics the look of a school of minnows or other bait fish to a predator fish, and is releasably securable to a standard fishing line above a common hook, live bait, or artificial lure. The attachment comprises a semi-rigid central segment portion of steel leader or similar material attachable at its upper end to the terminus of the fishing line to be used, and at its lower end to the hook, baited hook, or artificial lure. This central segment portion includes a plurality of spaced, independent spinner members along its length, so that when it is pulled straight, the spinner members define a generally colinear series of light-reflecting surfaces. At least one pair of co-planar, opposed arm portions, composed of wire or similarly rigid yet flexible material, project from this central segment portion at or near its upper end, and each of these opposed arm portions carries an independent spinner member at its respective end remote from the central segment portion, and thereby offset from the colinear series of spinners. Thus, these spinner members collectively define a planar body of spaced, light-reflecting surfaces, generally wider at the upper (leading) end than the lower (trailing) end, ahead of a trailing hook or lure.

3 Claims, 1 Drawing Sheet

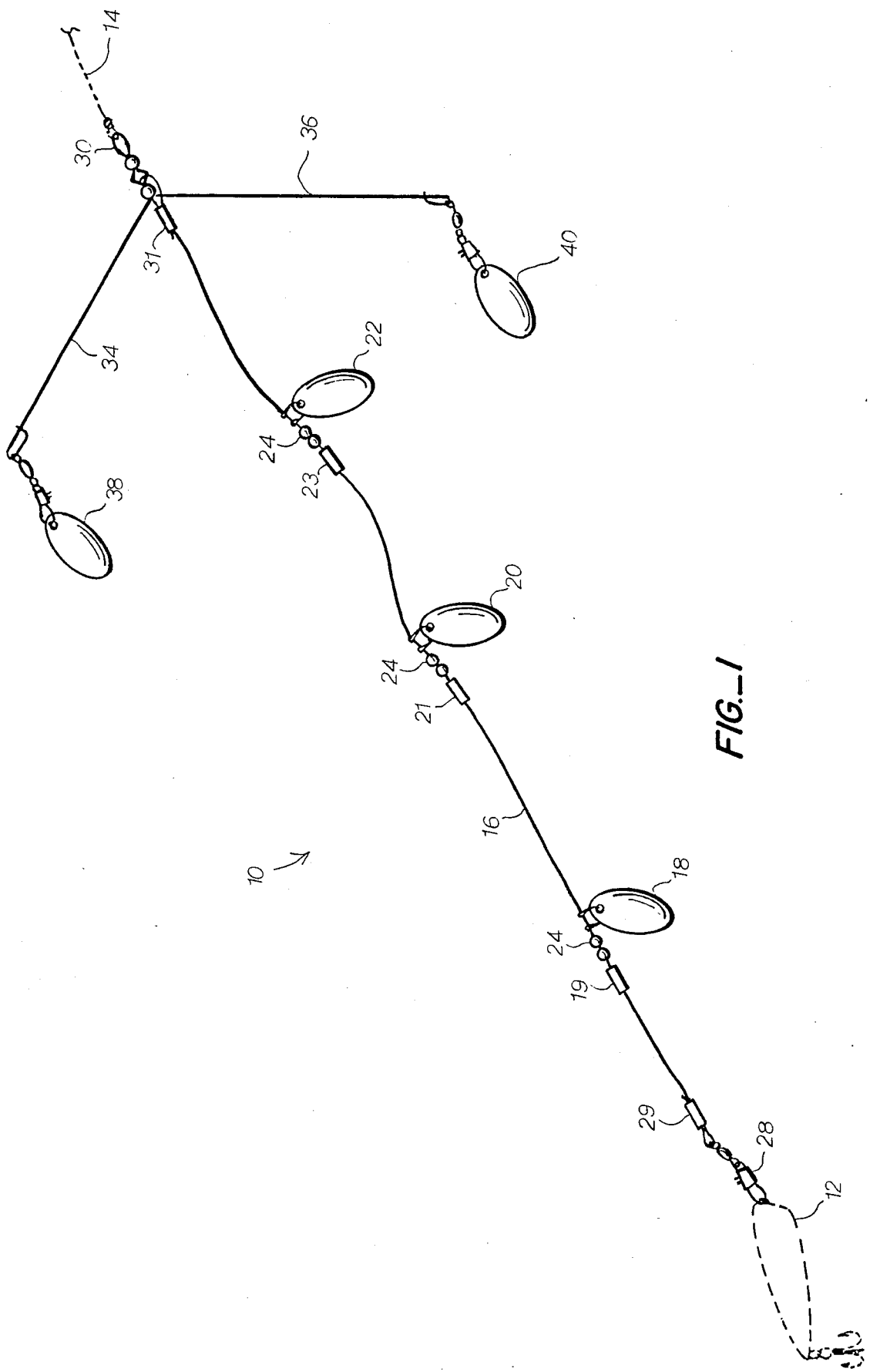
FIG._1

FISHING LURE ATTACHMENT

BACKGROUND OF THE INVENTION

1. Field of the Invention

This invention relates generally to sporting goods and outdoor activity apparatus, and more specificially to an improved fishing lure attachment.

2. Description of the Prior Art

Fishing has been, and continues to be, a popular commercial and recreational activity. Most rod and reel type fishing requires the attachment of either live bait or an artificial lure to the fishing line to attract and hook the fish. Numerous artificial lure devices have been developed to increase the "luck" of the angler by providing a device that has the look and/or feel of the fishes' natural prey, such as minnows, insects, or worms. Other artificial lures rely on visual attraction devices only, such as brightly colored streamers, highly reflective spoons, or the like. Still other artificial lures produce a distinctive sensory vibration that is supposedly attractive to the fish. However, most of these known artificial lures are used in solitary fashion, and do not serve to enhance or improve any other bait or lure. In addition, these known artificial lures tend to mimic only a solitary prey to the predator fish, and thus do not always have the desired attractive effect.

SUMMARY OF THE INVENTION

The fishing lure attachment of this invention provides a fish-attracting device that mimics the look of a school of minnows or other bait fish to a predator fish, and is releasably securable to a standard fishing line above a common hook, live bait, or artificial lure. The inventive device comprises a semirigid central segment portion of steel leader or similar material attachable at its upper end to the terminus of the fishing line to be used, and at its lower end to the hook, baited hook, or artificial lure. This central segment portion includes a plurality of spaced, independent spinner members along its length, so that when the central segment portion is pulled straight, the spinner members define a generally colinear series of light-reflecting surfaces, designed to spin around the central segment portion without tangling. At least one pair of co-planar, opposed arm portions, composed of stainless steel wire, piano wire, or similarly rigid yet flexible material, project from this central segment portion at or near its upper end, and each of these opposed arm portions carries an independent spinner member at its respective end remote from the central segment portion, and thereby offset from the colinear series of spinners. Thus, these spinner members collectively define a planar body of spaced, light-reflecting surfaces, generally wider at the upper (leading) end than the lower (trailing) end, ahead of a trailing hook or lure.

In use, the device is trolled through the water, where the offset spinner members assume a generally horizontal, or gently rolling, position relative to the central, colinear spinner members, which themselves act like a rudder or tail to trail behind the offset spinners and ahead of the hook in use. Thus, the spinner members independently reflect light to resemble the look of a natural school of bait fish, which attracts and provokes the predator fish into feeding and striking the hook.

No keel or other weight is needed to make the fishing lure attachment track properly through the water. In addition, the relative rigidity of the wire used, and especially the stainless steel wire (or its equivalent) used for the opposed arm portions, prevents the device from becoming tangled upon itself in use.

BRIEF DESCRIPTION OF THE DRAWINGS

FIG. 1 is a side elevational view of a fishing lure attachment of this invention, in position with a standard fishing lure (indicated in phantom) attached at its lower end, and a standard fishing line (also indicated in phantom) attached at its upper end.

DETAILED DESCRIPTION OF A PREFERRED EMBODIMENT

FIG. 1 is a side elevational view of a fishing lure attachment 10 of this invention, in position with a standard fishing lure 12 (indicated in phantom) attached at its lower end, and a standard fishing line 14 (also indicated in phantom) attached at its upper end. Attachment 10 comprises a length or central segment portion 16 of semi-rigid yet readily flexible material such as steel leader wire or the like, approximately twelve to eighteen inches in length. Attached at generally equally-spaced intervals, e.g., three and one-half inches, along the length of segment portion 16 are a series of central spinner blade members 18, 20, and 22, each independently swivelable about central segment portion 16. These central spinner members turn against and are kept in position on segment 16 by beads 24, which are themselves prevented from moving down the segment by proper placement of crimp-style clamps 19, 21, and 23. The lower end of segment 16 includes a snap swivel 28 or similar attachment device, secured by a clamp 29, to enable ready engagement and/or disengagement of the attachment 10 to lure 12. Similarly, the upper end of segment 16 includes a swivel 30 or similar attachment device, secured by a clamp 31, to enable ready connection and/or disconnection of attachment 10 to fishing line 14.

At least one pair of opposed arm portions 34, 36 are attached to central segment portion 16 at or near its upper end near snap 30, and extend outwardly and away from central segment portion 16 a distance of, e.g., four and one-half inches. In the preferred embodiment, these arm portions are angled slightly back from perpendicularity with segment portion 16, thus adopting a generally V-shaped configuration. A pair of offset spinner blade members 38, 40 are attached at or near the remote ends of these arm portions. These offset spinner blade members spin independently from the central spinner blades, and thus yield a planar dimension to the reflected light as the device is pulled through the water.

While this invention has been described in connection with preferred embodiments thereof, it is obvious that modifications and changes therein may be made by those skilled in the art to which it pertains without departing from the spirit and scope of the invention. For example, the length of the central segment portion, opposed arm portions, and the separation of the spinner members can all be modified to accommodate different sized spinners, tackle, and the like, and for different environments (e.g., salt-water fishing). In addition, further sets of the opposed arm portions could be attached to the central segment portion to further emphasize the offset nature and breadth of the reflections. Still further, additional spinner members could be added to the central segment portion or arm portions to increase the sheer number of reflections. Accordingly, the scope of this invention is to be limited only by the appended claims.

What is claimed as invention is:

1. A fishing lure attachment comprising:

a semi-rigid one piece central segment portion having a first end and a second end, said first end conditioned for releasable engagement to a fishing line, and said second end conditioned for releasable engagement to a fishing hook;

a plurality of independent central light-reflecting spinner members colinearly spaced along the length of said central segment portion;

a pair of opposed arm portions secured to said central segment portion first end, said arm portions being coplanar with said central segment portion and with each other, and projecting outwards from said central segment portion first end at an acute angle towards said second end, said arm portions each having a remote end; and an offset light-reflecting spinner member attached to each of said arm portion remote ends; wherein when said first end is attached to a fishing line, said second end is attached to a fishing hook, and said attachment is pulled through the water, said spinner members collectively define a planar body of spaced, light-reflecting surfaces, generally wider proximate said first end than said second end.

2. The fishing lure attachment of claim 1 wherein said central spinner members are equally spaced from one another.

3. The fishing lure attachment of claim 2 wherein said central segment portion and said opposed arm portions are composed of steel wire, and having three central spinner members and two offset spinner members.

* * * * *